(12) United States Patent
Jake et al.

(10) Patent No.: US 12,086,012 B2
(45) Date of Patent: Sep. 10, 2024

(54) INTELLIGENT TERMINAL FOR PREVENTING MAL-OPERATION OF POWER EQUIPMENT

(71) Applicant: Smartran, Inc., San Jose, CA (US)

(72) Inventors: Paul M. Z. Jake, San Jose, CA (US); An Bin, San Jose, CA (US); M. Kennedy, San Jose, CA (US)

(73) Assignee: SMARTRAN, INC., San Jose, CA (US)

( * ) Notice: Subject to any disclaimer, the term of this patent is extended or adjusted under 35 U.S.C. 154(b) by 523 days.

(21) Appl. No.: 17/495,998

(22) Filed: Oct. 7, 2021

(65) Prior Publication Data

US 2023/0115038 A1    Apr. 13, 2023

(51) Int. Cl.
| | |
|---|---|
| *G06F 1/3287* | (2019.01) |
| *G06F 1/30* | (2006.01) |
| *G06F 1/3206* | (2019.01) |
| *H02H 1/00* | (2006.01) |
| *H04W 84/02* | (2009.01) |
| *G06F 1/28* | (2006.01) |
| *H02H 3/04* | (2006.01) |

(52) U.S. Cl.
CPC .............. *G06F 1/3287* (2013.01); *G06F 1/30* (2013.01); *G06F 1/3206* (2013.01); *H02H 1/0092* (2013.01); *H04W 84/02* (2013.01); *G06F 1/28* (2013.01); *H02H 1/0061* (2013.01); *H02H 3/044* (2013.01)

(58) Field of Classification Search
CPC ...... G06F 1/30; G06F 11/0796; G06F 1/3206; G06F 11/3055; G06F 1/3287; G06F 11/328; G06F 11/0754; G06F 11/3062; G06F 1/28; H04W 84/02; H02H 1/0092; H02H 1/0061; H02H 3/044
See application file for complete search history.

(56) References Cited

U.S. PATENT DOCUMENTS

| | | | |
|---|---|---|---|
| 2003/0205938 A1* | 11/2003 | Andarawis | H02H 7/30 307/11 |
| 2004/0024475 A1* | 2/2004 | Berkcan | H04L 43/00 700/295 |
| 2005/0251296 A1* | 11/2005 | Tracy Nelson | H02H 1/0092 700/286 |

(Continued)

*Primary Examiner* — Yong Hang Jiang
(74) *Attorney, Agent, or Firm* — Locke Lord LLP; Tim Tingkang Xia, Esq.

(57) ABSTRACT

An intelligent terminal device is provided for preventing mal-operation of a power equipment. The power equipment has safety devices, such as breakers, isolators or disconnectors. The intelligent terminal device includes a communication module, a display unit, an input/output (I/O) module, and a protection shell covering and protecting the communication module. The display unit is used to display a communication status and a status of an unlocking mode, which is switchable between a remote unlocking mode and an in-site unlocking mode. The I/O module provides power I/O and I/O of information of the status of the power equipment. The communication module is used to monitor the status of the power equipment and the safety devices, control actions of the safety devices, upload the status to a control device through a network; and in response to receiving an unlocking instruction from the control device, perform an unlocking procedure.

20 Claims, 13 Drawing Sheets

(56) References Cited

U.S. PATENT DOCUMENTS

| | | | | |
|---|---|---|---|---|
| 2007/0135971 A1* | 6/2007 | Andarawis | ........ | H02J 13/00001 |
| | | | | 700/292 |
| 2009/0254655 A1* | 10/2009 | Kidwell | ................. | H04L 67/12 |
| | | | | 709/224 |
| 2012/0265360 A1* | 10/2012 | Smit | ...................... | H02H 7/262 |
| | | | | 700/293 |
| 2017/0003664 A1* | 1/2017 | Lane | ....................... | E21F 13/00 |
| 2019/0286090 A1* | 9/2019 | Tabib | ........................ | G06F 1/28 |

* cited by examiner

| | |
|---|---|
| Application Layer 840 | Power Management, Power Generation, Power Transmission, Power Conversion, Power Distribution, Power Usage, Power Saving |
| Platform Layer 830 | Big Data, Cloud Computation, Artificial Intelligence, etc. |
| Network Layer 820 | LoRa Network, Zigbee Network, 5G Network, Satellite Network, etc. |
| Perception Layer 810 | Intelligent Terminal for Preventing Mal-Operation, Power Equipment, etc. |

FIG. 8

INTELLIGENT TERMINAL FOR PREVENTING MAL-OPERATION OF POWER EQUIPMENT

FIELD

The disclosure relates generally to internet of things (IoT) and power safety technology, and more particularly to an intelligent terminal for preventing mal-operation of a power equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mal-operation prevention device is a safety device commonly used in high voltage power systems such as substations, electric generating stations and power distribution networks. Currently, a mal-operation prevention device generally adopts a mechanical locking device and a device for preventing mal-operation with computer (PMC) or preventing mal-operation with a monitoring and control system (PMM). The mechanical interlock device and the device for PMC utilizes a mechanical key or a computer key for operation, which requires the staff of the power system to operate the power equipment at the operating site, and is thus with low operation efficiency, high strength and long time. Further, the operations to the power equipment and the mal-operation prevention device are conducted at the operating site, and the mal-operation prevention device is in the offline status, which may not satisfy the actual operation requirement of the intelligent power network. On the other hand, the device for PMM utilizes a power cable to be connected to the mal-operation prevention device, thus implementing the mal-operation blocking function. However, the deficiencies of such mal-operation blocking device exist in that (1) the mal-operation blocking device cannot realize long distance cable connection, and has complicated engineering application; and (2) the mal-operation blocking device cannot realize the overall and complicated mal-operation preventing and blocking requirement for the power system.

Therefore, a heretofore unaddressed need exists in the art to address the aforementioned deficiencies and inadequacies.

SUMMARY

One aspect of the disclosure relates to an intelligent terminal device for preventing mal-operation of a power equipment. The power equipment has at least one safety device. In certain embodiments, the intelligent terminal device includes: a communication module communicatively connected to the at least one safety device and at least one sensor disposed in the power equipment; a display unit communicatively connected to the communication module, configured to display a communication status and a status of an unlocking mode, wherein the unlocking mode is switchable between a remote unlocking mode and an in-site unlocking mode; an input/output (I/O) module communicatively connected to the communication module, configured to provide power I/O and I/O of information of the status of the power equipment; and a protection shell covering and protecting the communication module. The communication module is configured to: receive signals from the at least one sensor; monitor a status of the power equipment based on the signals received; monitor a status of the at least one safety device; control action of the at least one safety device; upload the status of the power equipment and the status of the at least one safety device to a control device through a network; and in response to receiving an unlocking instruction from the control device, perform an unlocking procedure to control the action of the at least one safety device, wherein in the in-site unlocking mode, the unlocking procedure requires a user unlocking input to be performed, and in the remote unlocking mode, the unlocking procedure is performed directly without the user unlocking input.

In certain embodiments, each of the at least one safety device is a breaker, an isolator, a disconnector, a web portal, or a grounding device.

In certain embodiments, the control device is an IoT platform or a mal-operation preventing operating system.

In certain embodiments, the communication module includes: a microcontroller unit (MCU) configured to process the signals received, generate the status of the power equipment and the status of the at least one safety device, and control the action of the at least one safety device; a combination circuit, configured to collect information and send the information to the MCU for processing; and a sensor communication module, configured to monitor the status of the power equipment based on the signals received from the at least one sensor; wherein the sensor communication module, an aggregate node and an access node form a real-time monitoring unit to real-time monitor the power equipment through the at least one sensor.

In certain embodiments, the sensor communication module includes: a network module configured to perform network communication for the intelligent terminal device; and a status collection module configured to collect the information from the power equipment and the at least one safety device.

In certain embodiments, the network module is a long range (LoRa) module, a Zigbee module, a 5G network module or a combination thereof.

In certain embodiments, when the unlocking mode is in the in-site unlocking mode, the unlocking procedure includes: receiving, by the access node, the unlocking instruction from the control device; receiving, by the sensor communication module, the unlocking instruction from the access node through the aggregate node; processing, by the MCU, the unlocking instruction; controlling, by the MCU, an indicating device to show the intelligent terminal device to be ready for the user unlocking input; and in response to the user unlocking input, controlling the action of the at least one safety device.

In certain embodiments, when the unlocking mode is in the remote unlocking mode, the unlocking procedure includes: receiving, by the access node, the unlocking instruction from the control device; receiving, by the sensor communication module, the unlocking instruction from the access node through the aggregate node; processing, by the MCU, the unlocking instruction; and controlling, by the MCU, the action of the at least one safety device directly.

In certain embodiments, the real-time monitoring unit is configured to real-time monitor the power equipment by: receiving, by the access node, the signals generated by the at least one sensor; receiving, by the sensor communication module, the signals from the access node through the aggregate node; processing, by the MCU, the signals to generate the status of the power equipment; sending, by the sensor communication module, the status of the power equipment to the access node through the aggregate node; and forwarding, by the access node, the status of the power equipment to the control device.

In certain embodiments, the combination circuit comprises a plurality of subsystems, and the subsystems include: a power off alert module configured to generate a power off alert signal in response to loss of power to the intelligent terminal device; a status collection module configured to collect the information from the power equipment and the at least one safety device; a clock circuit configured to generate a clock signal for the MCU; and a reset circuit configured to generate a reset signal for the MCU when the power to the intelligent terminal device is on, wherein each of the subsystems sends the information collected or the signal generated to the MCU for processing, the MCU is configured to output a status instruction or to perform a corresponding action based on the information or the signal received, and the display unit is configured to display the communication status and the status of the unlocking mode based on the status instruction.

In certain embodiments, the communication module further comprises a power conversion module, configured to convert power with an input voltage to operating power in an operating voltage, and the input voltage is higher than the operating voltage.

In certain embodiments, the operating power is separated into two power sources individual from each other, wherein the two power sources include: a simulating power source, configured to be provided to a relay to control the action of the at least one safety device; and a digital power source, configured to be provided to the MCU and the combination circuit.

In certain embodiments, the relay is controlled through a general purpose input/output (GPIO) interface, and the relay is separated from the MCU and the combination circuit by an optical coupler.

In certain embodiments, the protection shell is provided with a mechanical unlocking device for emergency unlocking the power equipment.

In certain embodiments, the communication module is disposed on a printed circuit board (PCB), the protection shell is provided with sliding slots, the PCB is configured to slide in the sliding slots to fix within the protection shell, and gaps exist between two sides of the PCB and the protection shell for heat dissipation of the communication module.

In certain embodiments, the intelligent terminal device is designated with an equipment identification, and the equipment identification is formed by a vendor code, a version label, a version number and a product serial number.

In another aspect of the present disclosure, a power equipment having the intelligent terminal device as discussed above is provided for preventing mal-operation of the power equipment.

A further aspect of the present disclosure relates to a power system, which includes: a plurality of power equipments; a plurality of terminal devices one-to-one correspondingly provided on the power equipments; and at least one control device communicatively connected to each of the terminal devices through a network. Specifically, each of the terminal devices is the intelligent terminal device as discussed above for preventing mal-operation of a corresponding one of the power equipments.

In certain embodiments, each of the terminal devices is designated with a unique equipment identification formed by a vendor code, a version label, a version number and a product serial number, such that the unique equipment identification is configured to identify each of the terminal devices and to distinguish each of the terminal devices from other ones of the terminal devices.

In certain embodiments, the communication module of each of the terminal devices includes: a microcontroller unit (MCU) configured to process the signals received, generate the status of the power equipment and the status of the at least one safety device, and control the action of the at least one safety device; a combination circuit, configured to collect information and send the information to the MCU for processing; and a sensor communication module, configured to monitor the status of the power equipment based on the signals received from the at least one sensor; wherein the sensor communication module, an aggregate node and an access node form a real-time monitoring unit to real-time monitor the power equipment through the at least one sensor.

In certain embodiments, for each of the terminal devices, when the unlocking mode is in the in-site unlocking mode, the unlocking procedure includes: receiving, by the access node, the unlocking instruction from the control device; receiving, by the sensor communication module, the unlocking instruction from the access node through the aggregate node; processing, by the MCU, the unlocking instruction; controlling, by the MCU, an indicating device to show the intelligent terminal device to be ready for the user unlocking input; and in response to the user unlocking input, controlling the action of the at least one safety device.

In certain embodiments, for each of the terminal devices, when the unlocking mode is in the remote unlocking mode, the unlocking procedure includes: receiving, by the access node, the unlocking instruction from the control device; receiving, by the sensor communication module, the unlocking instruction from the access node through the aggregate node; processing, by the MCU, the unlocking instruction; and controlling, by the MCU, the action of the at least one safety device directly.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 8 shows a chart of the layers of the power IoT system according to one embodiment of the present disclosure.

DETAILED DESCRIPTION OF THE DISCLOSURE

Figure 1A:
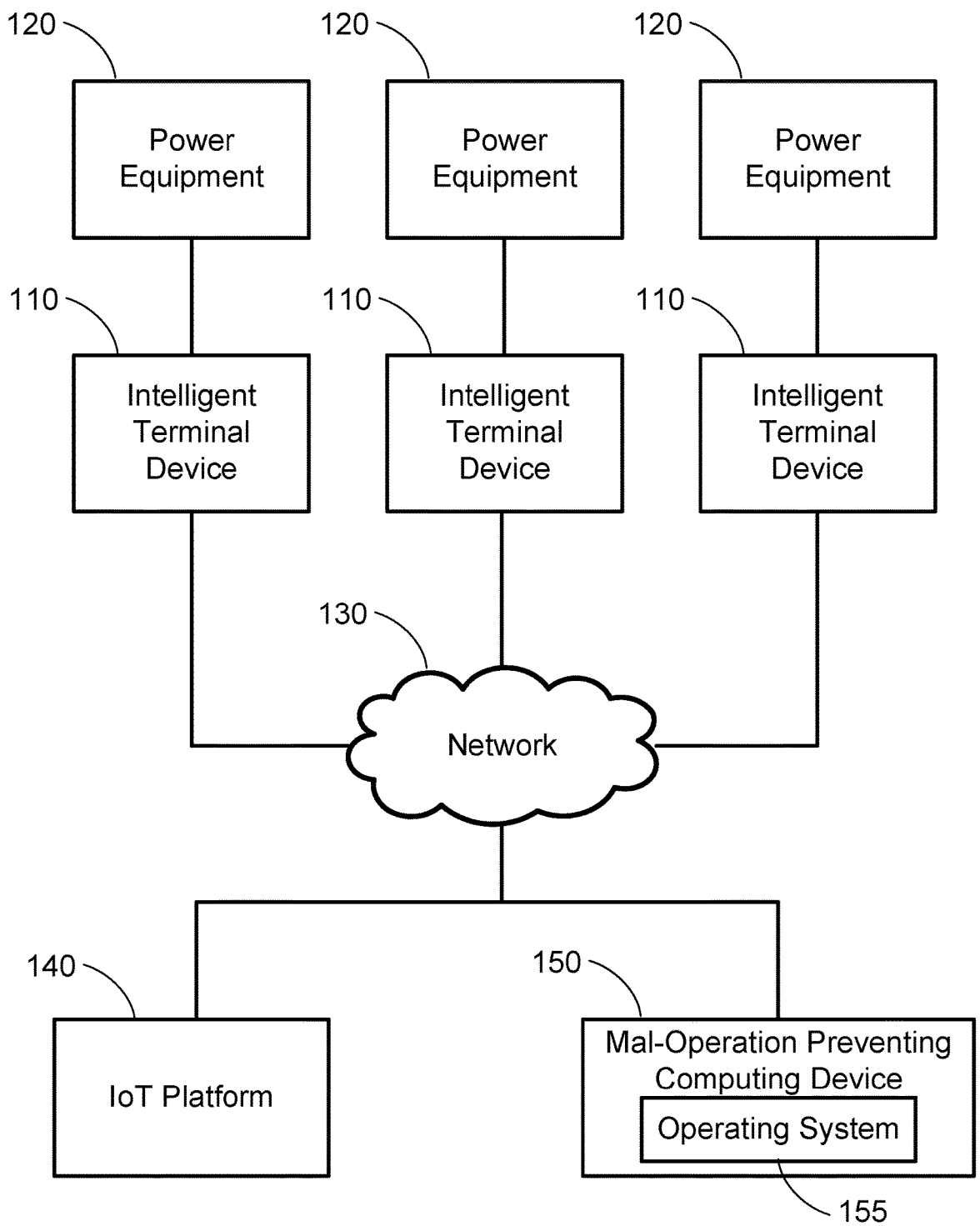
FIG. 1A schematically shows a block diagram of a power system having a plurality of power equipments and a plurality of intelligent terminal devices for preventing mal-operation of the power equipments according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The description will be made as to the embodiments of the present disclosure in conjunction with the accompanying drawings. In accordance with the purposes of this disclosure, as embodied and broadly described herein, this disclosure, in certain aspects, relates to an intelligent terminal device for preventing mal-operation of a power equipment.

As discussed above, there are certain deficiencies in the existing mal-operation blocking devices. The application of the power internet of things (IoT) system solves the deficiencies fundamentally. The power IoT system is a power system utilizing the IoT technology to perform communication between power management, power generation, power transmission, power distribution, power usage and power saving aspects, as well as communications between the power equipments, the staff and the users. With the use of the power IoT system, the status of each terminal device and each power equipment in the power system may be uploaded real-time to a control device, such as an IoT platform or a mal-operation preventing system. Further, the control device may control the actions of each intelligent terminal device based on the actual needs and the status of the corresponding power equipment, thus forming a closed loop logic, allowing the intelligent terminal device to perform the locking and unlocking operation based on the operating instructions, and thereby facilitating the locking/unlocking operations to all power equipments in the power system. In certain embodiments, the mal-operation preventing system utilizing the power IoT system may replace the locks (such as the electromagnetic locks, mechanical locks and electric locks) in the existing mal-operation preventing system by the intelligent terminal device, in which the operation instruction may be transmitted through wired or wireless communication.

In certain aspects of the present disclosure, the intelligent terminal device may perform real-time monitoring and controlling of the power equipment in the power system, facilitate safe and reliable switching of the operation status of the power equipment, and monitor the actions of the safety devices (such as breakers, isolators or disconnectors) in the power equipment, thus ensuring the safe operation of the power system. Further, the intelligent terminal device may real-time upload the status to the control system (such as the IoT platform or the mal-operation preventing system) for safety management and control, thus effectively preventing from accidents caused by human mal-operation, protecting the user safety of the staff of the power system, and protecting the power equipments and the power system to operate safely.

FIG. 1A schematically shows a block diagram of a power system according to certain embodiments of the present disclosure. As shown in FIG. 1A, the power system 100 includes a plurality of intelligent terminal devices 110, a plurality of power equipments 120, a network 130, an internet of things (IoT) platform 140 and a mal-operation preventing computing device 150. Specifically, the intelligent terminal devices 110 and the power equipments 120 are one-to-one correspondingly connected, with each power equipment 120 being provided with a corresponding intelligent terminal device 110. Further, the intelligent terminal devices 110 are communicatively connected respectively to the IoT platform 140 and the mal-operation preventing computing device 150 through the network 130. The IoT platform 140 and the mal-operation preventing computing device 150 collectively form a control device for the intelligent terminal devices 110. The mal-operation preventing computing device 150 is provided with a mal-operation preventing operating system 155.

In the exemplary embodiment as shown in FIG. 1A, the power system 100 has three sets of intelligent terminal devices 110 and corresponding power equipments 120, one IoT platform 140, and one mal-operation preventing computing device 150.

However, the quantity of the intelligent terminal devices 110 and corresponding power equipments 120 as well as the control device (i.e., the IoT platform 140 and the mal-operation preventing computing device 150) in the power system 100 may vary. In certain embodiments, the power system 100 may include only one or more intelligent terminal devices 110 and one or more power equipments 120. In certain embodiments, the power system 100 may include multiple IoT platforms 140 and/or multiple mal-operation preventing computing devices 150. In certain embodiments, the power system 100 may include only one of the IoT platform 140 and the mal-operation preventing computing device 150, without having the other. In this case, the IoT platform 140 or the mal-operation preventing computing device 150 functions as the sole control device for the intelligent terminal devices 110. In certain embodiments, the network 130 may be a wired or wireless network, and may be of various forms. Examples of the network 130 may include, but is not limited to, a local area network (LAN), a wide area network (WAN) including the Internet, or any other type of networks.

Figure 1B:
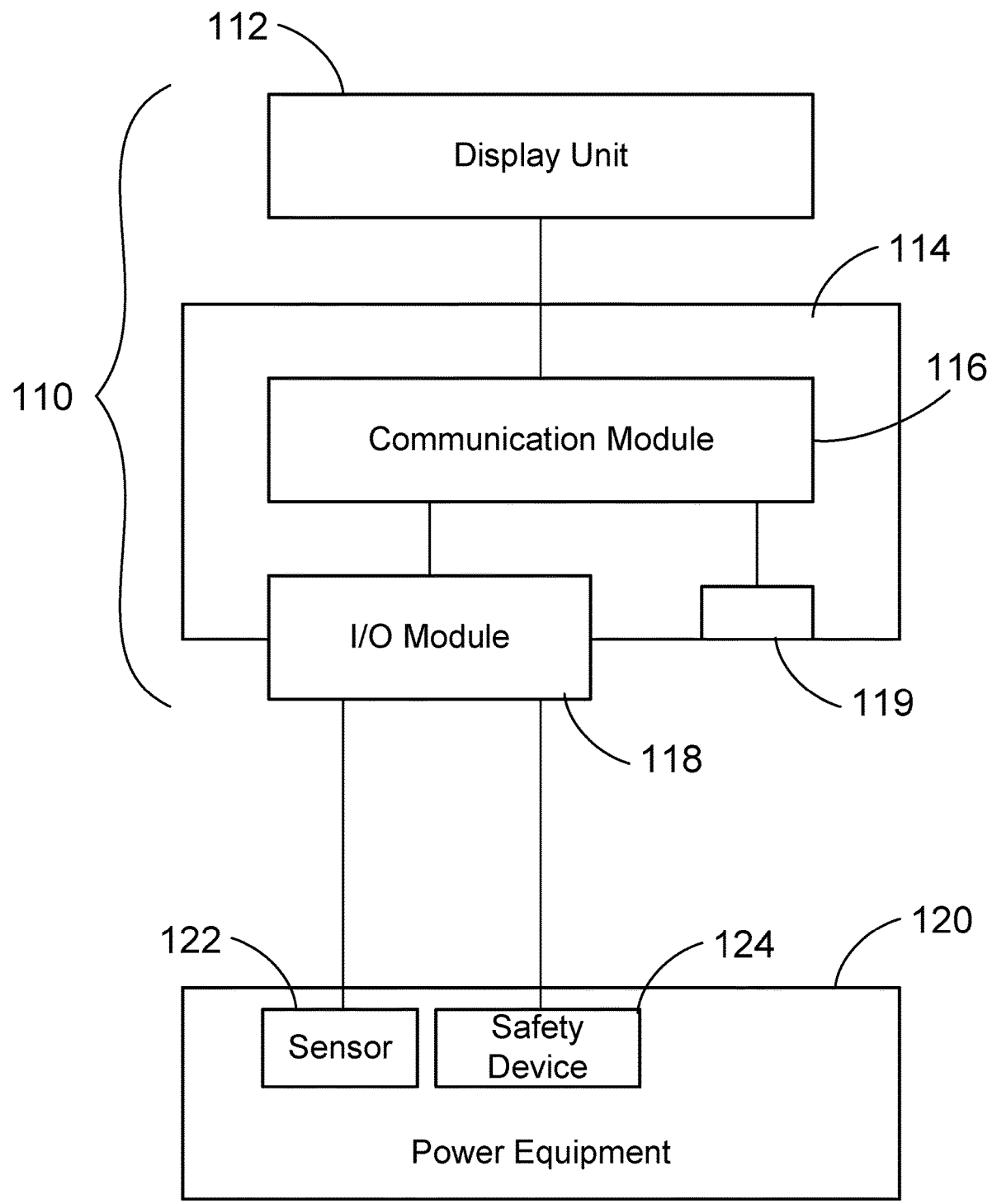
FIG. 1B schematically shows a block diagram of a power equipment and a corresponding intelligent terminal device as shown in FIG. 1A according to certain embodiments of the present disclosure.

FIG. 1B schematically shows a block diagram of a power equipment and a corresponding intelligent terminal device as shown in FIG. 1A according to certain embodiments of the present disclosure. As shown in FIG. 1B, the intelligent terminal device 110 includes a display unit 112, a protection shell 114, a communication module 116, an input/output (I/O) module 118 and a mechanical unlocking device 119. The power equipment 120 is provided with a sensor 122 and a safety device 124. It should be particularly noted that the intelligent terminal device 110 and/or the power equipment 120 may include other modules and/or hardware and/or software components not shown in FIG. 1B. Examples of these other modules and/or hardware and software components may include, but not limited to, memory, storage devices, interfaces, buses, circuits, I/O interfaces and peripheral devices.

The display unit 112 is a unit for displaying the status of the intelligent terminal device 110. As shown in FIG. 1B, the display unit 112 is disposed outside the protection shell 114, and is communicatively connected to the communication module 116. Specifically, the display unit 112 may be a display panel used to display a communication status of the communication module and a status of an unlocking mode. In certain embodiments, the unlocking mode is switchable between a remote unlocking mode and an in-site unlocking mode, and the status of the unlocking mode may be shown with a light being switched on or off to indicate one of the two unlocking modes. For example, the display unit 112 may include a light bulb showing the status of the unlocking mode, where the light is on in response to one unlocking mode, and the light is off in response to the other unlocking mode. In comparison, the communication status may be more complicated, and the showing of the communication status may require more complicated display features. In one embodiment, for example, the display unit 112 may include a multi-color light bulb emitting two different colors of lights to indicate the communication status of the communication module. An example of such multi-color light bulb may be a light showing green and red lights, in which the light is green to show normal communication operation, the light is red to show that a locking/unlocking instruction is received, and the light is turned off to show malfunctions of the communication, such as the case where the power equipment is out of order, the communication is down, the network is lost, or the network module (LoRa/Zigbee/5G network) is mal-functioning. In certain embodiments, other types of lights or indicating devices may be used to show the communication status and/or the status of the unlocking mode. In certain embodiments, the display unit 112 may include other interfaces, such as an antenna interface for an antenna to be mounted therein. In this case, an antenna light may be provided correspondingly.

The protection shell 114 is a shell for protecting the communication module 116. In certain embodiments, the communication module 116 may be provided on a printed circuit board (PCB), and the protection shell 114 may cover the PCB and the communication module 116 thereon to protect the communication module 116.

The communication module 116 is a module to provide communication functions for the intelligent terminal device 110. In certain embodiments, the communication module 116 is communicatively connected to the sensor 122 and the safety device disposed in the power equipment 120. The operation of the communication module 116 may include, without being limited thereto, receiving signals from the sensor 122; monitoring a status of the power equipment 120 based on the signals received; monitoring a status of the safety device 120; controlling actions of the safety device 124; upload the status of the power equipment 120 and the status of the safety device 124 to the control device (i.e., the IoT platform 140 and the mal-operation preventing computing device 150 as shown in FIG. 1A) through the network 130; and in response to receiving an unlocking instruction from the control device, performing a corresponding unlocking procedure to control the actions of the safety device 124. Details of the operation of the communication module 116 will be further elaborated below.

The I/O module 118 is a module formed by I/O interfaces to perform I/O functions for the intelligent terminal device 110. Specifically, the I/O module 118 is communicatively connected to the communication module 116 to provide power I/O and I/O of information of the status of the power equipment.

The mechanical unlocking device 119 is an emergency safety device which allows the user to perform an emergency unlocking procedure using mechanical instruments, without going through the regular unlocking procedure. Specifically, the mechanical unlocking device 119 may be a mechanical device that allows the user to quickly perform the emergency unlocking procedure, and meanwhile is sufficiently safe without being easily triggered in an unintended scenario. For example, in one embodiment, the mechanical unlocking device 119 may be in the form of a mechanical key hole disposed on the protection shell 114 that matches with a specific mechanical key, such that in certain emergency cases, the user may use the mechanical key to directly unlock the intelligent terminal device 110 through the mechanical key hole. In one embodiment, the unlocking of the mechanical unlocking device 119 may switch the relay to short-circuit, such that the intelligent terminal device 110 is unlocked. In certain embodiments, other types of mechanical devices may be provided as the mechanical unlocking device 119.

The sensor 122 is a sensing device disposed in the power equipment 120 to perform sensing functions. As shown in FIG. 1B, only one sensor 122 is provided in the power equipment 120. However, the power equipment 120 may be provided with multiple sensors 122. In certain embodiments, the sensor 122 may be, without being thereto, a temperature sensor, an electromagnetic sensor, a current sensor, a voltage sensor, a humidity sensor, or other types of sensors.

The safety device 124 is a device disposed in the power equipment 120 to provide safety measures. As shown in FIG. 1B, only one safety device 124 is provided in the power equipment 120. However, the power equipment 120 may be provided with multiple safety devices 124. In certain embodiments, the safety device 124 may be, without being limited thereto, a breaker, an isolator or a disconnector, which may be turned on or turned off to connect or disconnect certain electrical connections within the power equipment 120. In certain embodiments, the safety device 124 may be, without being limited thereto, a web portal, which may be enabled or disabled; or a grounding device, which may be grounded or not grounded.

Figure 2A:
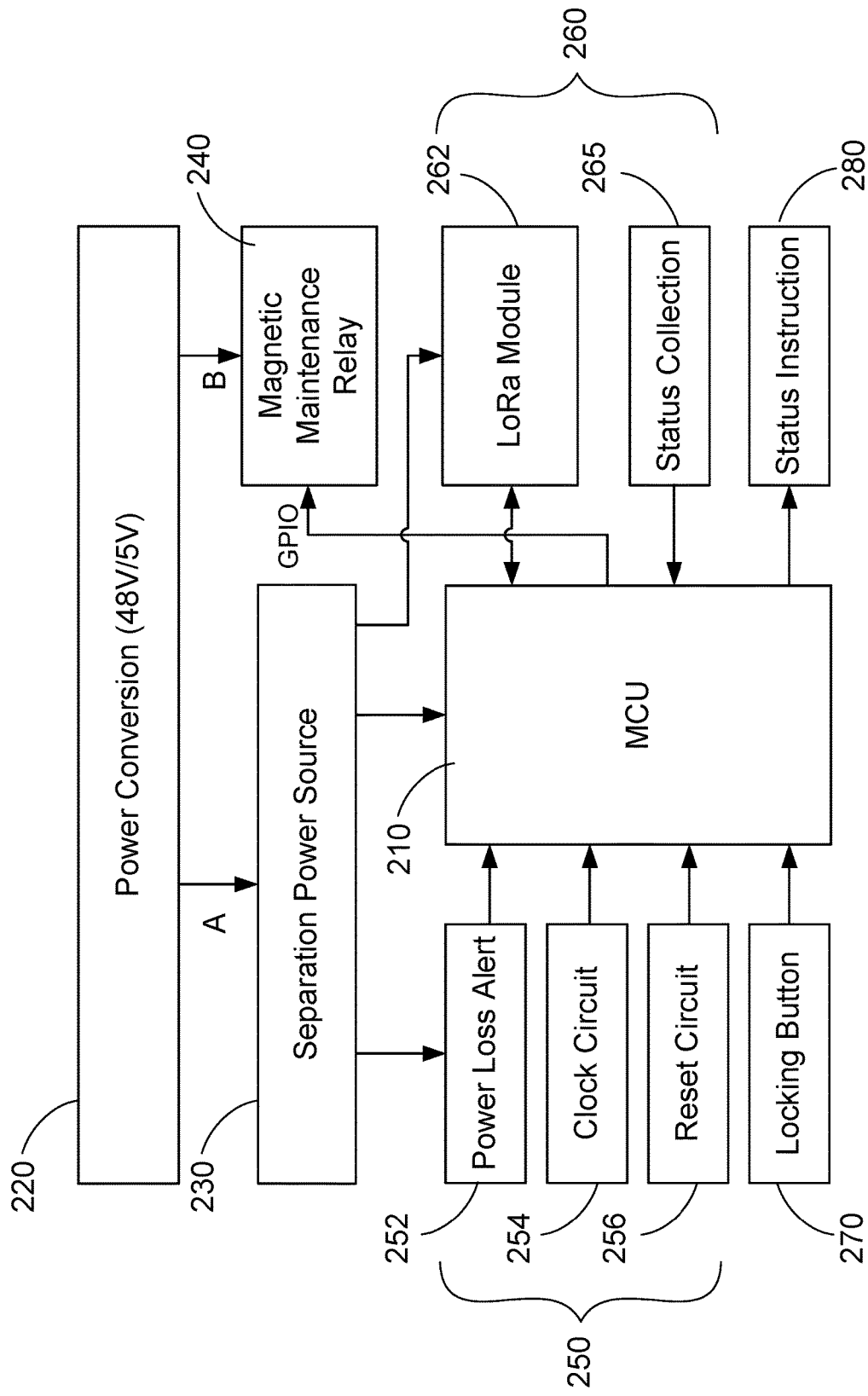
FIG. 2A schematically shows a block diagram of the communication module of the intelligent terminal device as shown in FIG. 1B according to certain embodiments of the present disclosure.

FIG. 2A schematically shows a block diagram of the communication module of the intelligent terminal device as shown in FIG. 1B according to certain embodiments of the present disclosure. Specifically, the communication module 200 as shown in FIG. 2A may function as the communication module 116 as shown in FIG. 1B. As shown in FIG. 2A, the communication module 200 includes, among other things, a microcontroller unit (MCU) 210, a power conversion module 220, a separation power source 230, a magnetic maintenance relay 240 (hereinafter the relay 240), a combination circuit 250, and a sensor communication module 260. Further, a locking button 270 is communicatively connected to the MCU 210. It should be noted that the modules and circuits as shown in FIG. 2A, unless otherwise noted, may be formed by electrical circuits and/or hardware and/or software components, or a combination thereof.

The MCU 210 is the processing unit of the communication module 200. Specifically, the MCU 210 may be in the form of a chip, which is used to control the operations of all other modules of the communication module 200, process the signals received by the communication module 200 from the sensor 122, generate the status of the power equipment and the status of the safety device 124, and control the action of the at least one safety device based on the locking or unlocking instruction received from the control device.

The power conversion module 220 is a module to convert power with an input voltage to operating power in an operating voltage. In certain embodiments, the power conversion module 220 may be implemented by a DC-DC power converter for converting power from a higher input voltage to a lower operating voltage. In other words, the input voltage is higher than the operating voltage. For example, in one embodiment, the input voltage may be 48V, and the operating voltage may be +5V. Further, once the power is converted to the operating voltage (e.g., +5V), the operating power is separated into two power sources A and B individual from each other. Specifically, the two power sources includes a digital power source A, which is used to be provided to the MCU 210, the combination circuit 250 and the sensor communication module 260; and a simulating power source B, which is used to be provided to the relay 240. Specifically, the purpose for providing the two power sources A and B individual from each other is to prevent the operation of the relay 240 from generating crosstalk interference to the digital components (i.e., the MCU 210, the combination circuit 250 and the sensor communication module 260).

The separation power module 230 is a module to separate the digital power source A to the digital components (i.e., the MCU 210, the combination circuit 250 and the LoRa module 260).

The relay 240 is a switching device used to control the actions of the safety device 124. Specifically, as discussed above, the safety device 124 may be, without being limited thereto, a breaker, an isolator or a disconnector, which may be turned on or turned off to connect or disconnect certain electrical connections within the power equipment 120. The relay 240 is used to switch between an ON status and an OFF status to control the actions of the breaker, the isolator and/or the disconnector. In certain embodiments, the communication module 200 may include more than one relay 240.

The combination circuit 250 is a group of modules or circuits to collect information and send the information to the MCU 210 for processing. As shown in FIG. 2A, the combination circuit 250 includes a plurality of subsystems, including, without being limited thereto, a power off alert module 252, a status collection module 254, a clock circuit 254 and a reset circuit 256. In certain embodiments, the combination circuit 250 may include other subsystems not shown in FIG. 2.

The power off alert module 252 is used to, in response to loss of power to the intelligent terminal device, generate a power off alert signal for the MCU 210. Specifically, the intelligent terminal device may include a power storage module (such as a battery) for storing power when the input power is in a normal power supply mode. When the power is loss (either by intended shutting down the power or in unintended emergency cases), the power off alert module 252 may output a low voltage signal as the power off alert signal to the MCU 210 such that the MCU 210 is aware of the power loss event. Meanwhile, the power storage module may keep providing power for the communication module 200 for a period of time (e.g., 5 second, or other designated time period), allowing the MCU 210 to report the power loss event to the control device within the period of time.

The clock circuit 254 is used to generate a clock signal for the MCU 210. In certain embodiments, the clock signal is used as an operating clock for the MCU 210. In one embodiment, the combination circuit 250 may include more than one clock circuit 254 to provide more than one clock signal. For example, the combination circuit 250 may include two individual clock circuits 254, in which one clock circuit 254 provides a clock signal for the MCU 210 as the operating clock signal, and the other clock circuit 254 provides a separate clock signal to be used as a real-time clock (RTC).

The reset circuit 256 is used to generate a reset signal for the MCU 210 when the input power to the intelligent terminal device 110 is on. Specifically, the reset circuit 256 may be implemented by an NRST pin, which is used to activate a bootloader for the MCU 210. When the power to the intelligent terminal device 110 is on, the NRST pin generates a NRST signal, allowing the MCU 210 to reset and perform booting.

In certain embodiments, each of the subsystems of the combination circuit 250 sends the information collected or the signal generated to the MCU 210 for processing, and the MCU 210 is used to output a status instruction 280 or to perform a corresponding action (through controlling the relay 240 with a GPIO interface, as shown in FIG. 2A) based on the information or the signal received. Meanwhile, and the display unit 112 may also display the communication status and the status of the unlocking mode based on the status instruction 280 generated by the MCU 210.

The sensor communication module 260 is a group of modules or circuits used to perform communication and to monitor the status of the power equipment based on the signals received from the sensor 122. As shown in FIG. 2A, the sensor communication module 260 includes a plurality of subsystems, including, without being limited thereto, a long range (LoRa) module 262 and a status collection module 265. In certain embodiments, the combination circuit 250 may include other subsystems not shown in FIG. 2.

The LoRa module 262 is a network module for performing LoRa communication. LoRa (which is short for long range) is a spread spectrum modulation technique derived from chirp spread spectrum (CSS) technology, which may be utilized in a long range, low power wireless platform in the IoT system. It should be noted that, although FIG. 2 shows the LoRa module 262 as the network module for the communication module 200, it is possible that the communication module 200 may utilize different network communication technologies or protocols. In certain embodiments, for example, the communication module 200 may utilize a Zigbee module or a 5G network module to replace the Lora module 262. In one embodiment, the communication module 200 may include multiple network modules selected from LoRa, Zigbee or the 5G network, without being limited thereto.

The status collection module 265 is a module used to collect the information from the sensor 122 and the safety device 124 of the power equipment 120 for the MCU 210 to process. Specifically, the status collection module 254 may be connected to the I/O module 119 to collect the information from the power equipment 120. In certain embodiments, the status collection module 265 may include two sets of signal collection input interfaces (with one set being normally opened and the other set being normally closed) to collect the information from the power equipment 120.

The locking button 270 is an input device for a user to generate a user unlocking input for the MCU 270 to perform the unlocking procedure. Specifically, as discussed above, the unlocking mode of the intelligent terminal device 110 is switchable between a remote unlocking mode and an in-site unlocking mode. In this case, the light bulb showing the status of the unlocking mode may be combined with the locking button 270, such that the user may be aware of the unlocking mode of the intelligent terminal device 110 before pressing the locking button 270. In the in-site unlocking mode, the light bulb may show a green light, indicating the status of the unlocking mode as being in the in-site unlocking mode, where the unlocking procedure requires a user unlocking input to be performed. Thus, the user may press the locking button 270 to generate an unlocking signal as the user unlocking input, allowing the MCU 210 to perform the unlocking procedure. In comparison, in the remote unlocking mode, the light bulb may show a red light, indicating the status of the unlocking mode as being in the remote unlocking mode. In this case, the MCU 210 may perform the unlocking procedure without the user unlocking input, and the user is aware of the remote unlocking status based on the indication of the red light, which indicates that no user action is required.

Figure 2B:
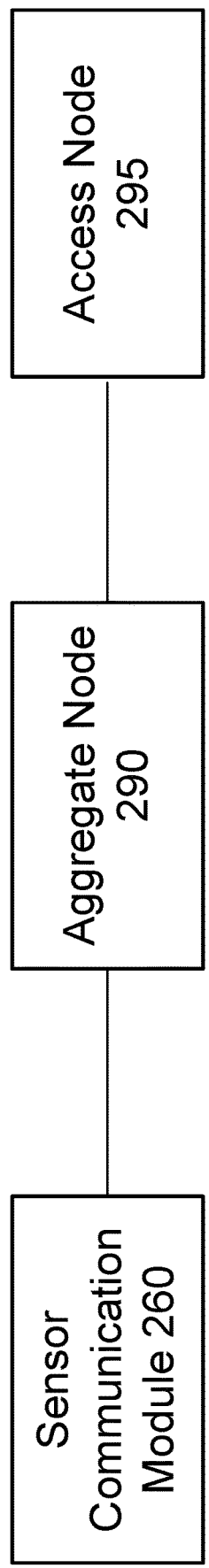
FIG. 2B schematically shows a block diagram of a real-time monitoring unit formed by the sensor communication module as shown in FIG. 2A, an aggregate node and an access node according to certain embodiments of the present disclosure.

In certain embodiments, the sensor communication module 260 may function together with an aggregate node and an access node, thus forming a real-time monitoring unit to real-time monitor the power equipment 120 through the sensor 122. For example, FIG. 2B schematically shows a block diagram of a real-time monitoring unit formed by the sensor communication module as shown in FIG. 2A, an aggregate node and an access node according to certain embodiments of the present disclosure. As shown in FIG. 2B, the real-time monitoring unit is formed by the sensor communication module 260 together with an aggregate node 290 and an access node 295. Specifically, the aggregate node 290 and the access node 295 may be implemented by hardware/software components in the network 130, or may be implemented by hardware/software components of one or more of the power equipments 120, and are thus not a part of the intelligent terminal device 110. The aggregate node 290 functions similarly to a modem for the corresponding power equipment (or multiple corresponding power equipments), and the access node 295 functions similarly to a router for the corresponding power equipment. In certain embodiments, the real-time monitoring unit is in the form of a power IoT system, allowing the intelligent terminal device 110 to be a part of the power IoT system. In one embodiment, the real-time monitoring unit is configured to real-time monitor the power equipment by: receiving, by the access node, the signals generated by the at least one sensor; receiving, by the sensor communication module, the signals from the access node through the aggregate node; processing, by the MCU, the signals to generate the status of the power equipment; sending, by the sensor communication module, the status of the power equipment to the access node through the aggregate node; and forwarding, by the access node, the status of the power equipment to the control device.

Figure 3A:
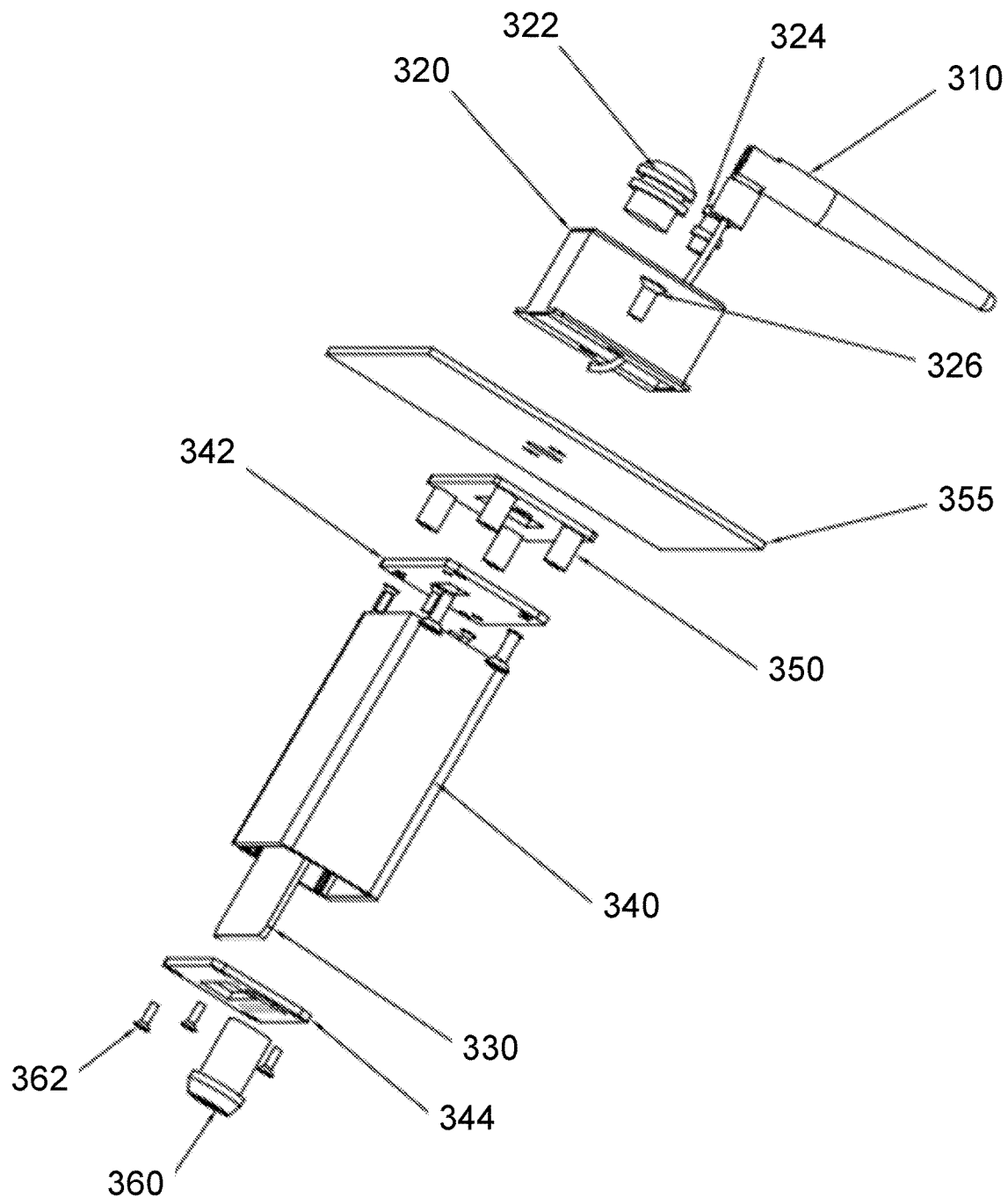
FIG. 3A schematically shows an overall structure of an intelligent terminal device for preventing mal-operation of the power equipment according to certain embodiments of the present disclosure.
Figure 3B:
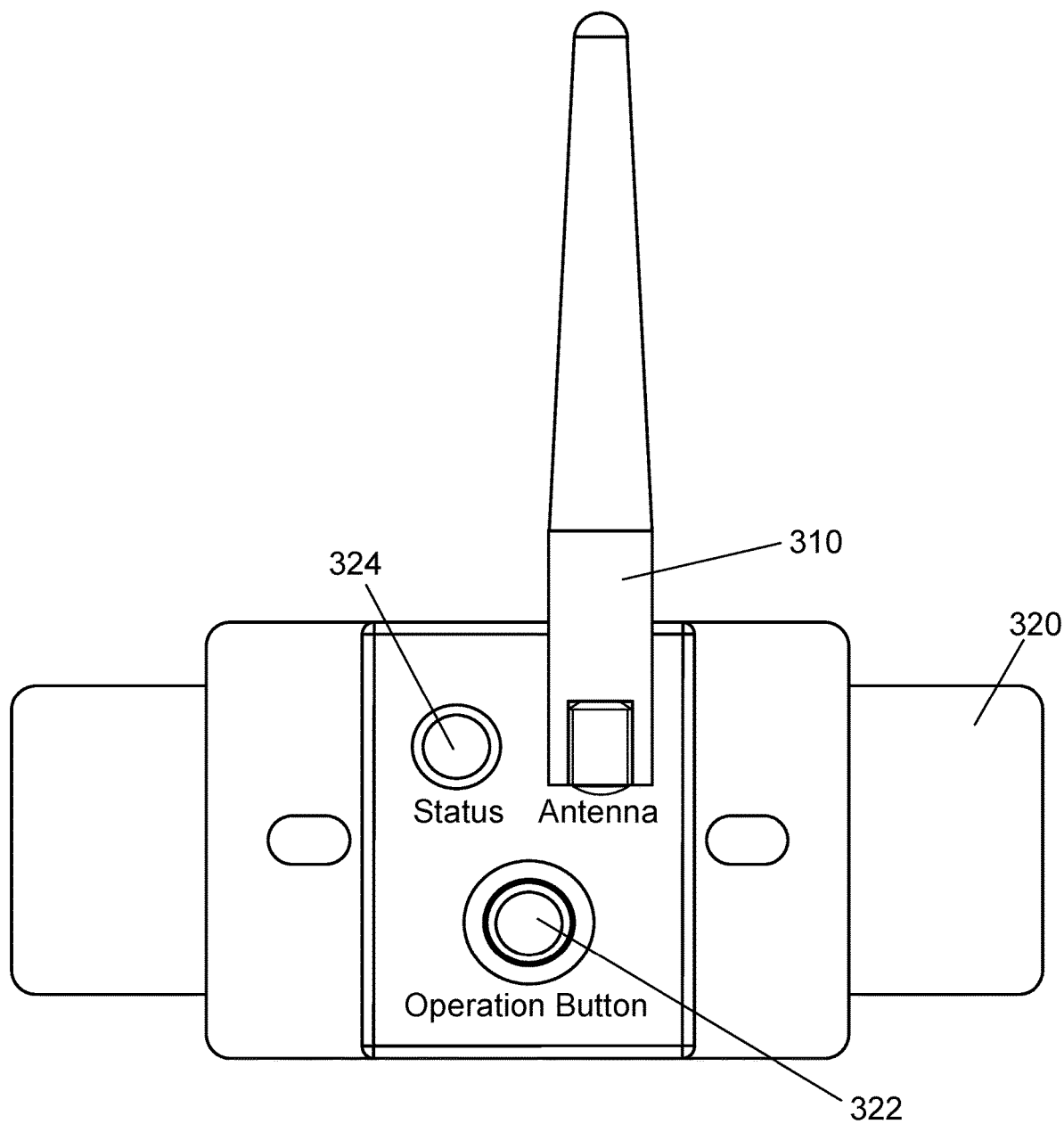
FIG. 3B schematically shows a display unit of the intelligent terminal device as shown in FIG. 3A according to one embodiment of the present disclosure.
Figure 3C:
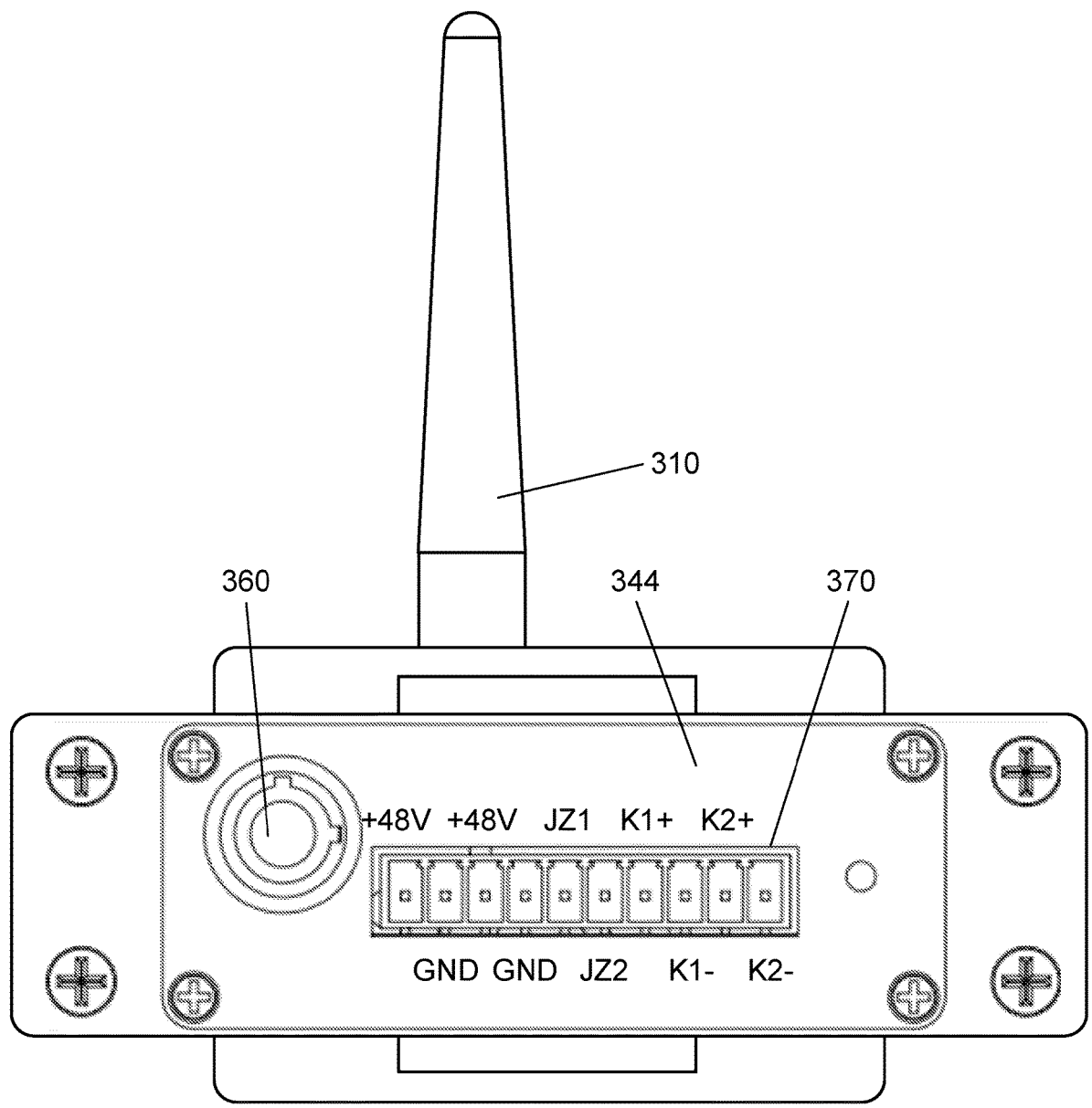
FIG. 3C schematically shows an I/O module of the intelligent terminal device as shown in FIG. 3A according to one embodiment of the present disclosure.

FIGS. 3A-3E schematically show an actual structure of an intelligent terminal device for preventing mal-operation of the power equipment according to certain embodiments of the present disclosure. Specifically, the intelligent terminal device 300 as shown in FIGS. 3A-3E may function as the intelligent terminal device 110 as shown in FIGS. 1A and 1B. As shown in FIG. 3A, the intelligent terminal device 300 includes an antenna 310, a display unit 320, an operating button 322, a status light 324, a communication module 330, a protection shell 340 having an upper sealing board 342 and a lower sealing board 344, a fixing plate 350, a main body 355, and a mechanical unlocking device 360. In one embodiment, the antenna 310 may be a SubMiniature Version A (SMA) antenna, or other types of antennas. As shown in FIG. 3B, the antenna 310, the operating button 322 and the status light 324 are installed on the display unit 320, in which the operating button 322 may function as the locking button 270 as shown in FIG. 2 with a corresponding light bulb showing the unlocking mode, and the status light 324 may be used to show the communication status. The display unit 320 is mounted on the upper side of the main body 355. As shown in FIG. 3C, the mechanical unlocking device 360 and the I/O interfaces of the I/O module 370 are installed on the lower sealing board 344 of the protection shell 340, and the protection shell 340 and the communication module 330 within the protection shell 340 are mounted and fixed by the fixing plate 350 on the lower side of the main body 355. In addition, a plurality of fixing screws 326 and 362 may be provided to fix the components together. In certain embodiments, the intelligent terminal device 300 may include other attachments or components not shown in FIGS. 3A-3C.

Figure 3D:
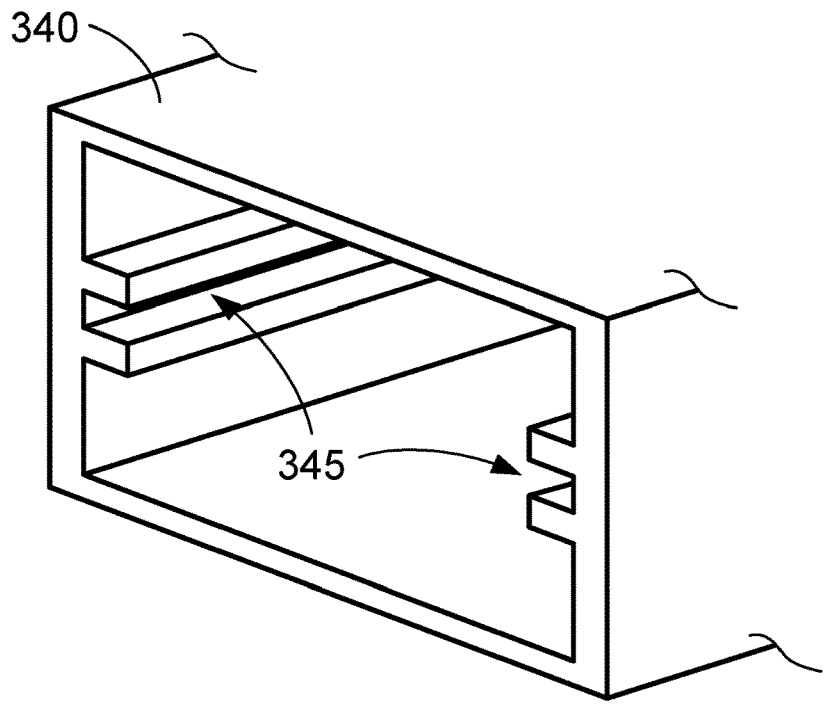
FIG. 3D schematically shows a protection shell of the intelligent terminal device as shown in FIG. 3A according to one embodiment of the present disclosure.
Figure 3E:
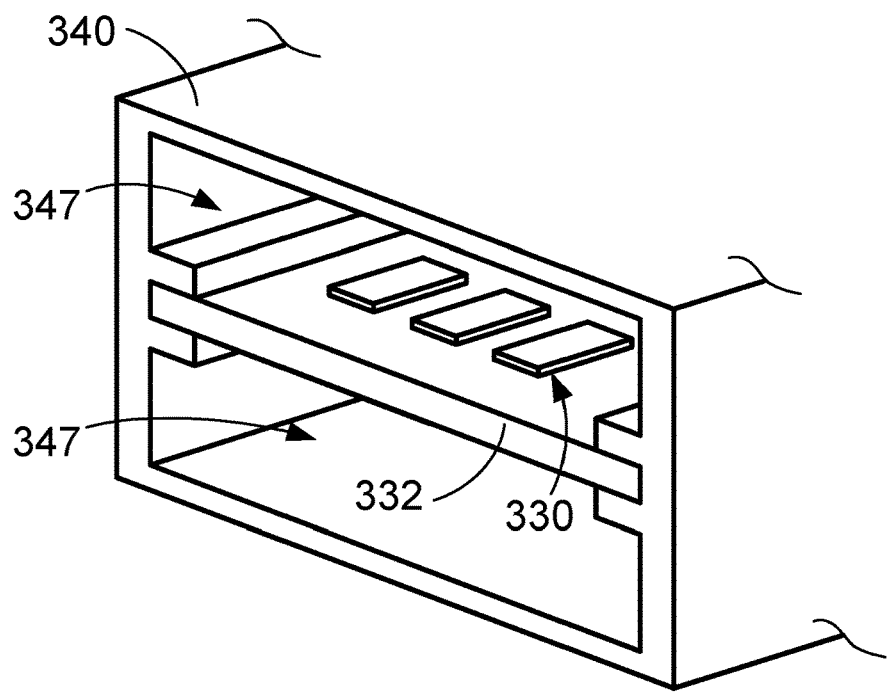
FIG. 3E schematically shows the protection shell as shown in FIG. 3D being fixed with the communication module on a PCB according to one embodiment of the present disclosure.

Further, as shown in FIG. 3D, the protection shell 340 is provided with sliding slots 345 for the communication module 330 to be fixed therein. Specifically, as shown in FIG. 3E, the communication module 330 is disposed on a PCB 332, and the PCB 332 may slide the sliding slots to fix within the protection shell 340. Once the PCB 332 and the communication module 330 thereon is fixed within the protection shell 340, gaps 347 exist between two sides of the PCB 332 and the side walls of the protection shell 340 for heat dissipation of the communication module 330.

Figure 4:
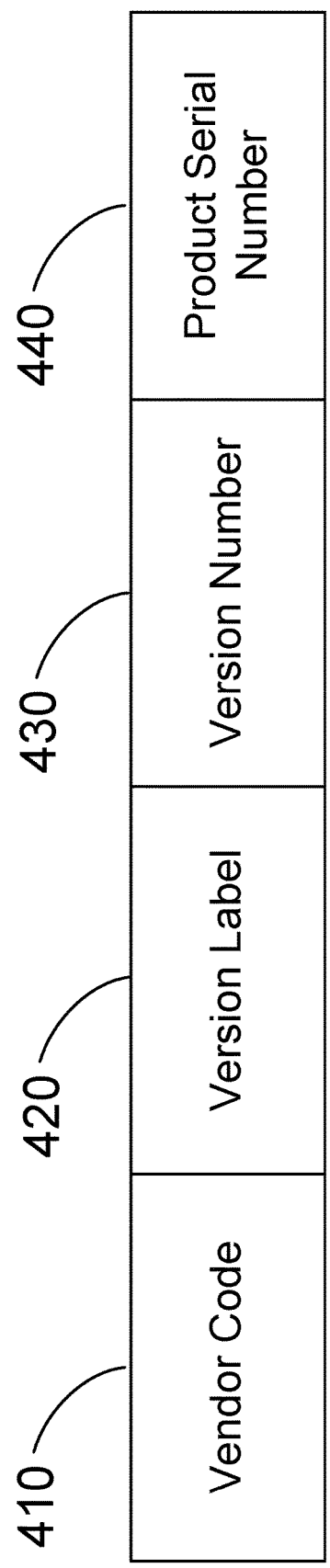
FIG. 4 schematically shows data structure of an equipment identification of the intelligent terminal device according to one embodiment of the present disclosure.

In certain embodiments, the intelligent terminal device is designated with an equipment identification, which is the unique data being used to identify the intelligent terminal device from other intelligent terminal devices. For example, in the power system 100 as shown in FIG. 1A, each intelligent terminal device 110 may have a unique equipment identification, such that a user at the control device (i.e., the IoT platform 140 and the mal-operation preventing computing device 150) may identify each intelligent terminal device 110 and its corresponding power equipment 120 using the unique equipment identification. FIG. 4 schematically shows data structure of an equipment identification of the intelligent terminal device according to one embodiment of the present disclosure. As shown in FIG. 4, the equipment identification 400 is formed by four sections, including a vendor code 410, a version label 420, a version number 430 and a product serial number 440. In certain embodiments, the equipment identification 400 may include other information which is unique for each intelligent terminal device 110 and its corresponding power equipment 120 for identification purposes.

Figure 5:
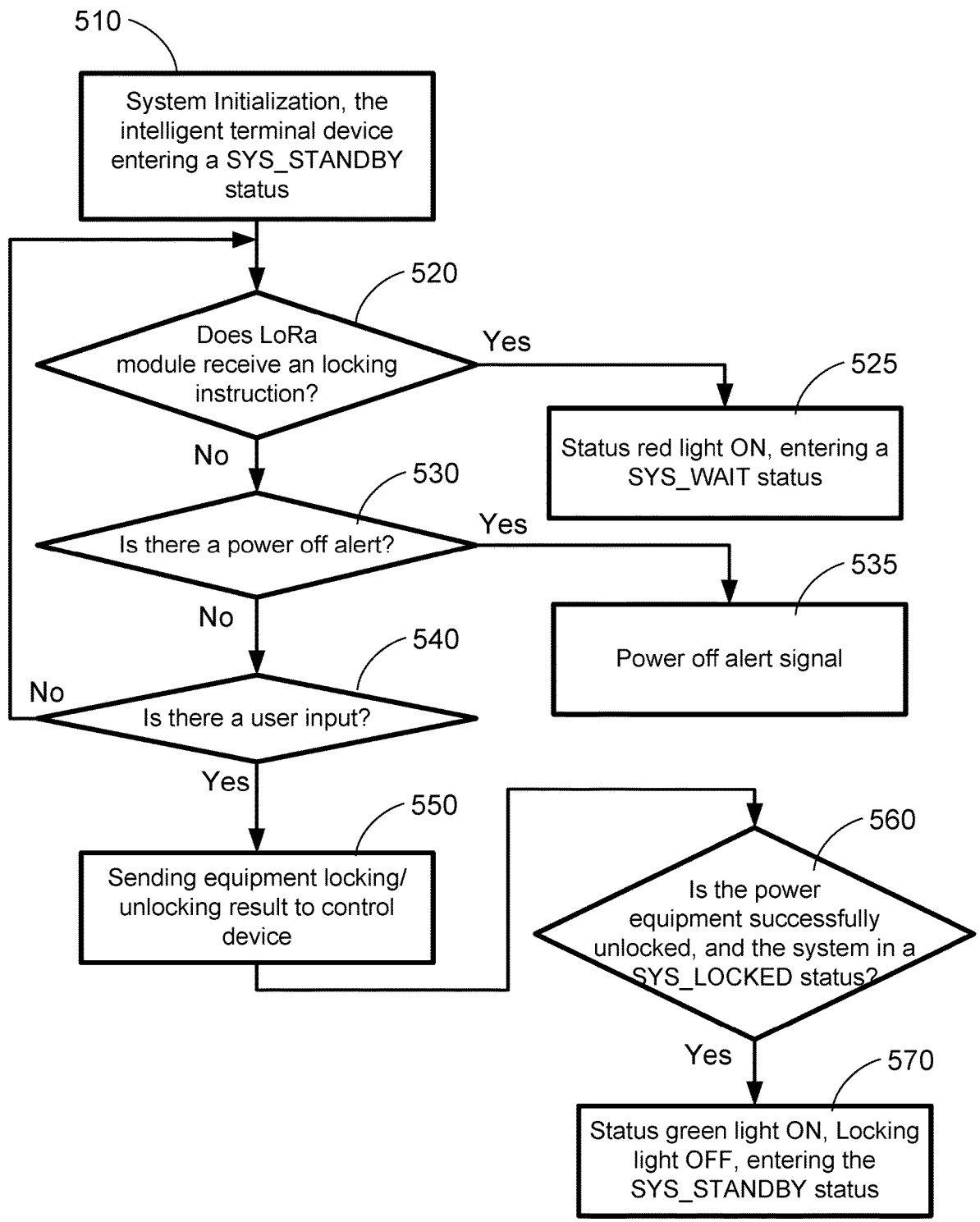
FIG. 5 shows a flowchart of the operation of the intelligent terminal device according to one embodiment of the present disclosure.

FIG. 5 shows a flowchart of the operation of the intelligent terminal device according to one embodiment of the present disclosure. Specifically, the operation as shown in FIG. 5 may be implemented on the intelligent terminal device as shown in FIGS. 1A, 1B and 3 with the communication module as shown in FIG. 2. It should be particularly noted that, unless otherwise stated in the disclosure, the steps of the operation may be arranged in a different sequential order, and are thus not limited to the sequential order as shown in FIG. 5.

Specifically, in the operation as shown in FIG. 5, the intelligent terminal device is in three different status: a standby status (shown as SYS_STANDBY), a waiting status (shown as SYS_WAIT), and a locking status (shown as SYS_LOCKED). As shown in FIG. 5, at procedure 510, the system of the intelligent terminal device is initialized, and the intelligent terminal device enters a SYS_STANDBY status. Then, at procedure 520, the communication module checks whether the LoRa module receives a locking instruction from the control device (i.e., the IoT platform 140 and the mal-operation preventing computing device 150 as shown in FIG. 1A). If the LoRa module (functioning as the access node) receives the locking instruction, at procedure 525, the MCU controls the status light 324 to show a red light, indicating that the unlocking instruction is received; and the intelligent terminal device enters a SYS_WAIT status. Then, at procedure 530, the communication module checks whether there is a power off alert (i.e., whether the power is off, either intended or unintended). If there is a power off alert, at procedure 535, the power off alert module generates a power off alert signal for the MCU. If not, at procedure 540, the communication module checks whether there is a user input. If no user input is received, the system goes back to the procedure 520 to further check whether the LoRa module receives an locking instruction from the control device. If the system receives a user input 540, at procedure 550, the MCU sends the equipment locking/unlocking result to the control device. Then, at procedure 560, the system checks whether the power equipment is successfully unlocked, and the system is in a SYS_LOCKED status. If not, there is an error. If so, at procedure 570, the MCU controls the status light 324 to show a green light, indicating that the power equipment is successfully unlocked, and the intelligent terminal device returns to the SYS_STANDBY status.

Figure 6A:
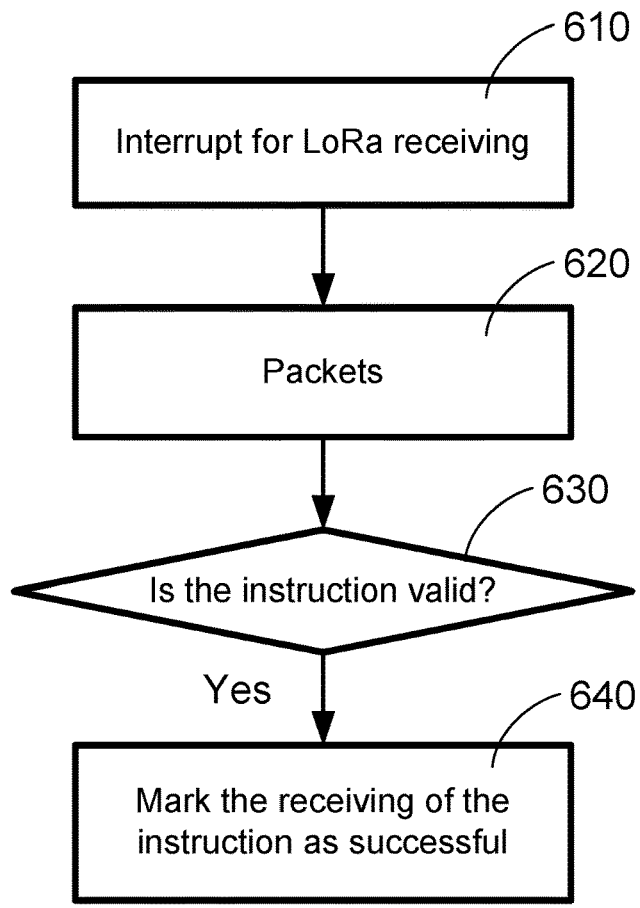
FIG. 6A shows a flowchart of the operation of the LoRa module according to one embodiment of the present disclosure.

FIG. 6A shows a flowchart of the operation of the LoRa module according to one embodiment of the present disclosure. Specifically, the operation of the LoRa module applies to the procedure 520 as shown in FIG. 5. As shown in FIG. 6A, at procedure 610, the LoRa module receives an interrupt. At procedure 620, the LoRa module receives the packets. At procedure 630, the LoRa modules checks whether the packets received constitutes a valid instruction. If it is determined that a valid instruction is received, at procedure 640, the LoRa module marks the receiving of the instruction as being successful.

Figure 6B:
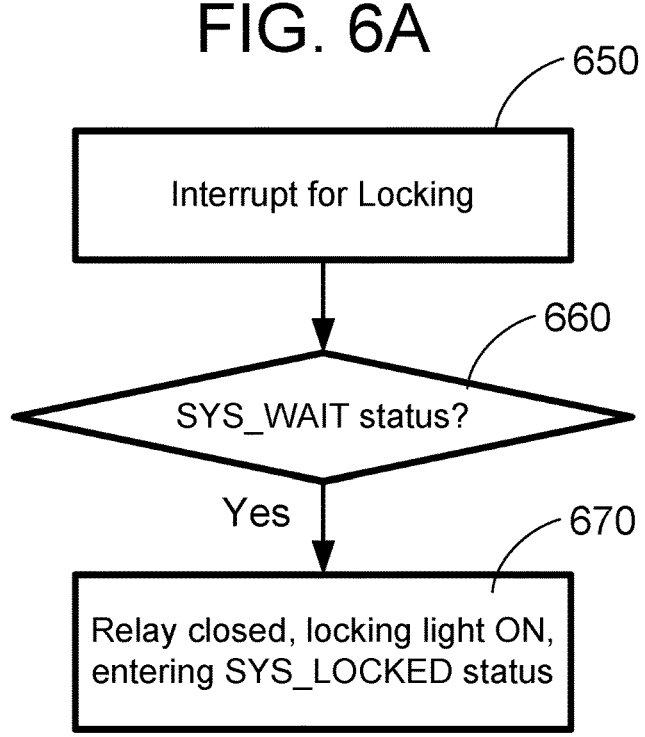
FIG. 6B shows a flowchart of the operation of the locking/unlocking procedure according to one embodiment of the present disclosure.

FIG. 6B shows a flowchart of the operation of the locking/unlocking procedure according to one embodiment of the present disclosure. Specifically, the operation of the locking/unlocking procedure applies to the procedure 560 as shown in FIG. 5. As shown in FIG. 6B, at procedure 650, an interrupt for locking is received. At procedure 660, the system checks whether the status is in the SYS_WAIT status. If so, the MCU controls the relay to close, the locking light is turned ON, and the system is switched to the SYS_LOCKED status.

Figure 7:
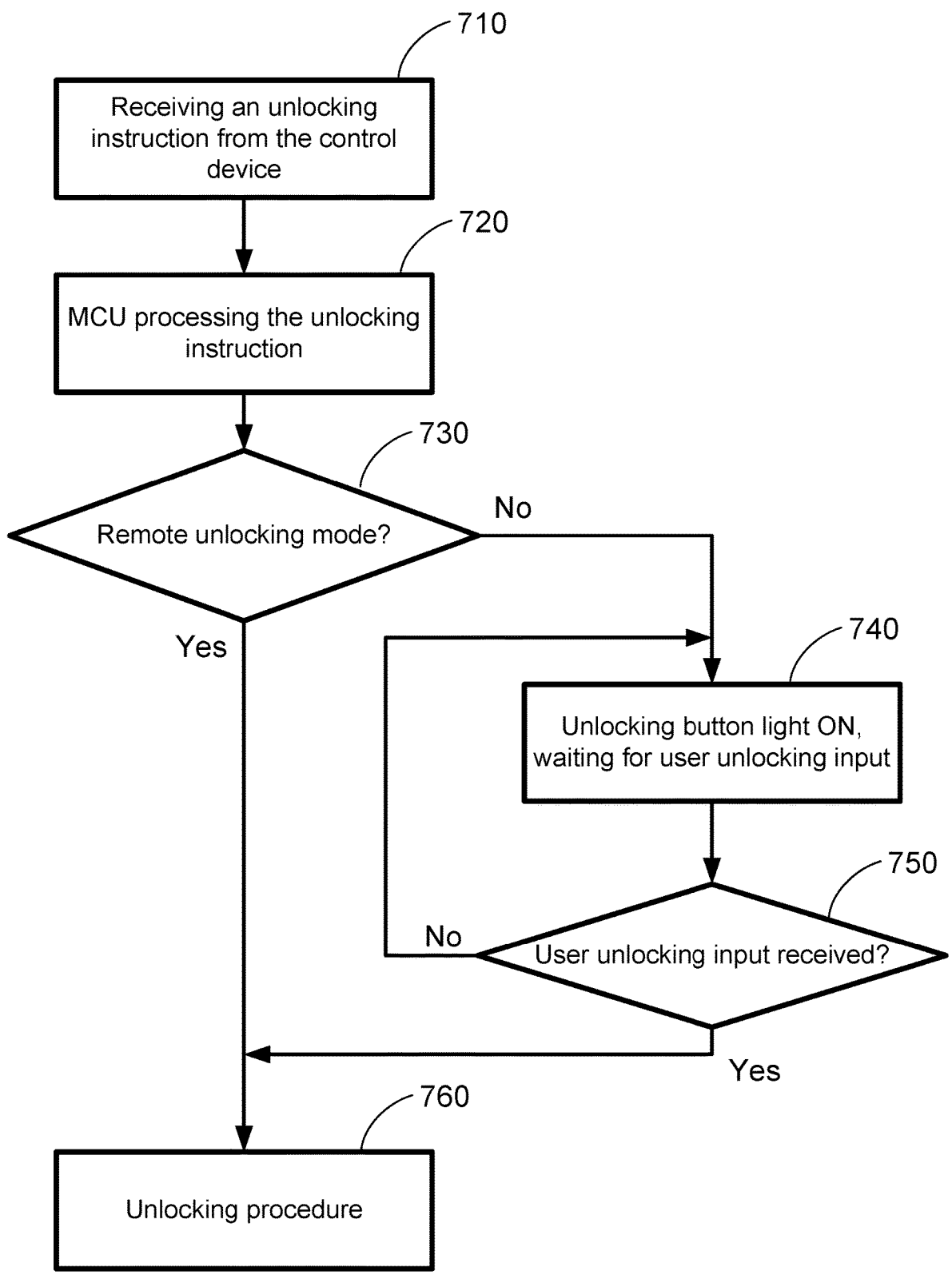
FIG. 7 shows a flowchart of the unlocking operation of the intelligent terminal device according to one embodiment of the present disclosure.

FIG. 7 shows a flowchart of the unlocking operation of the intelligent terminal device according to one embodiment of the present disclosure. Specifically, the unlocking operation as shown in FIG. 7 may be implemented on the intelligent terminal device as shown in FIGS. 1A, 1B and 3 with the communication module as shown in FIG. 2. It should be particularly noted that, unless otherwise stated in the disclosure, the steps of the operation may be arranged in a different sequential order, and are thus not limited to the sequential order as shown in FIG. 7.

As shown in FIG. 7, at procedure 710, the communication module receives the unlocking instruction from the control device (i.e., the IoT platform 140 and the mal-operation preventing computing device 150 as shown in FIG. 1A). Specifically, the access node receives the unlocking instruction from the control device, and forwards the unlocking instruction to the aggregate node; and then the aggregate node forwards the unlocking instruction to the sensor communication device, such that the sensor communication device receives the unlocking instruction. Then, at procedure 720, the MCU processes the unlocking instruction. At procedure 730, the MCU checks the unlocking mode (which is switchable between the remote unlocking mode and the in-site unlocking mode). In the in-site unlocking mode, the MCU goes to procedure 740 to control the unlocking button light to turn ON, such that the user is aware that the user unlocking input is required; and then wait for the user unlocking input. At procedure 750, the MCU checks whether the user has pressed the unlocking button to generate a user unlocking input. If not, the system returns to procedure 740 to keep waiting. If the user unlocking input is received, at procedure 760, the MCU performs the unlocking procedure. On the other hand, in the remote unlocking mode, the MCU goes directly to the procedure 760 to perform the unlocking procedure, without waiting for the user unlocking input.

As discussed above, the intelligent terminal for preventing mal-operation of the power equipment according to certain embodiments of the present disclosure may be used in or as a part of a power IoT system. FIG. 8 shows a chart of the layers of the power IoT system according to one embodiment of the present disclosure. As shown in FIG. 8, the power IoT system includes a perception layer 810, a network layer 820, a platform layer 830 and an application layer 840. Specifically, the perception layer 810 is formed by the intelligent terminal device and the power equipment, as well as other devices or equipments in the power system. The network layer 820 is formed by the network components, such as LoRa/Zigbee/5G/satellite network, or other network being utilized. The platform layer 830 is formed by the technology platform being used, such as big data, cloud computation, artificial intelligence, or other platforms. The application layer includes the application of the power IoT system, which includes, without being limited thereto, power management, power generation, power transmission, power distribution, power usage and power saving aspects.

In certain embodiments, the intelligent terminal device for preventing mal-operation of the power equipment according to certain embodiments of the present disclosure may replace the locks (such as the electromagnetic locks, mechanical locks and electric locks) in the existing mal-operation preventing system. In certain embodiments, the intelligent terminal device may be used to real-time monitor and detect the information of the status of the power equipment, and sends the information to the control device. Further, when the control device does not provide an instruction, the intelligent terminal device does not perform any action to the power equipment. In other words, the action to the power equipment is controlled by the intelligent terminal device only when the control device issues an instruction. Thus, the operation of the intelligent terminal device may effectively prevent from accidents caused by human mal-operation, protect the user safety of the staff of the power system, and protect the power equipments and the power system to operate safely.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An intelligent terminal device for preventing mal-operation of a power equipment, the power equipment having at least one safety device, the intelligent terminal device comprising:
   a communication module communicatively connected to the at least one safety device and at least one sensor disposed in the power equipment;
   a display unit communicatively connected to the communication module, configured to display a communication status and a status of an unlocking mode, wherein the unlocking mode is switchable between a remote unlocking mode and an in-site unlocking mode;
   an input/output (I/O) module communicatively connected to the communication module, configured to provide power I/O and I/O of information of the status of the power equipment; and
   a protection shell covering and protecting the communication module,
   wherein the communication module is configured to:
      receive signals from the at least one sensor;
      monitor a status of the power equipment based on the signals received;
      monitor a status of the at least one safety device;
      control action of the at least one safety device;
      upload the status of the power equipment and the status of the at least one safety device to a control device through a network; and
      in response to receiving an unlocking instruction from the control device, perform an unlocking procedure to control the action of the at least one safety device, wherein in the in-site unlocking mode, the unlocking procedure requires a user unlocking input to be performed, and in the remote unlocking mode, the unlocking procedure is performed directly without the user unlocking input.

2. The intelligent terminal device of claim 1, wherein each of the at least one safety device is a breaker, an isolator, a disconnector, a web portal, or a grounding device.

3. The intelligent terminal device of claim 1, wherein the control device is an IoT platform or a mal-operation preventing operating system.

4. The intelligent terminal device of claim 1, wherein the communication module comprises:
   a microcontroller unit (MCU) configured to process the signals received, generate the status of the power equipment and the status of the at least one safety device, and control the action of the at least one safety device;
   a combination circuit, configured to collect information and send the information to the MCU for processing; and
   a sensor communication module, configured to monitor the status of the power equipment based on the signals received from the at least one sensor;
   wherein the sensor communication module, an aggregate node and an access node form a real-time monitoring unit to real-time monitor the power equipment through the at least one sensor.

5. The intelligent terminal device of claim 4, wherein the sensor communication module comprises:
   a network module configured to perform network communication for the intelligent terminal device; and
   a status collection module configured to collect the information from the power equipment and the at least one safety device.

6. The intelligent terminal device of claim 5, wherein the network module is a long range (LoRa) module, a Zigbee module, a 5G network module or a combination thereof.

7. The intelligent terminal device of claim 4, wherein when the unlocking mode is in the in-site unlocking mode, the unlocking procedure comprises:
   receiving, by the access node, the unlocking instruction from the control device;
   receiving, by the sensor communication module, the unlocking instruction from the access node through the aggregate node;
   processing, by the MCU, the unlocking instruction;
   controlling, by the MCU, an indicating device to show the intelligent terminal device to be ready for the user unlocking input; and
   in response to the user unlocking input, controlling the action of the at least one safety device.

8. The intelligent terminal device of claim 4, wherein when the unlocking mode is in the remote unlocking mode, the unlocking procedure comprises:
   receiving, by the access node, the unlocking instruction from the control device;
   receiving, by the sensor communication module, the unlocking instruction from the access node through the aggregate node;
   processing, by the MCU, the unlocking instruction; and
   controlling, by the MCU, the action of the at least one safety device directly.

9. The intelligent terminal device of claim 4, wherein the real-time monitoring unit is configured to real-time monitor the power equipment by:
   receiving, by the access node, the signals generated by the at least one sensor;
   receiving, by the sensor communication module, the signals from the access node through the aggregate node;

processing, by the MCU, the signals to generate the status of the power equipment;

sending, by the sensor communication module, the status of the power equipment to the access node through the aggregate node; and forwarding, by the access node, the status of the power equipment to the control device.

10. The intelligent terminal device of claim 4, wherein the combination circuit comprises a plurality of subsystems, and the subsystems comprise:

a power off alert module configured to generate a power off alert signal in response to loss of power to the intelligent terminal device;

a clock circuit configured to generate a clock signal for the MCU; and a reset circuit configured to generate a reset signal for the MCU when the power to the intelligent terminal device is on, wherein each of the subsystems sends the information collected or the signal generated to the MCU for processing, the MCU is configured to output a status instruction or to perform a corresponding action based on the information or the signal received, and the display unit is configured to display the communication status and the status of the unlocking mode based on the status instruction.

11. The intelligent terminal device of claim 4, wherein the communication module further comprises a power conversion module, configured to convert power with an input voltage to operating power in an operating voltage, and the input voltage is higher than the operating voltage.

12. The intelligent terminal device of claim 11, wherein the operating power is separated into two power sources individual from each other, wherein the two power sources include:

a simulating power source, configured to be provided to a relay to control the action of the at least one safety device; and a digital power source, configured to be provided to the MCU and the combination circuit.

13. The intelligent terminal device of claim 12, wherein the relay is controlled through a general purpose input/output (GPIO) interface, and the relay is separated from the MCU and the combination circuit by an optical coupler.

14. The intelligent terminal device of claim 1, wherein the protection shell is provided with a mechanical unlocking device for emergency unlocking the power equipment.

15. The intelligent terminal device of claim 1, wherein the communication module is disposed on a printed circuit board (PCB), the protection shell is provided with sliding slots, the PCB is configured to slide in the sliding slots to fix within the protection shell, and gaps exist between two sides of the PCB and the protection shell for heat dissipation of the communication module.

16. The intelligent terminal device of claim 1, wherein the intelligent terminal device is designated with an equipment identification, and the equipment identification is formed by a vendor code, a version label, a version number and a product serial number.

17. A power equipment having the intelligent terminal device of claim 1 for preventing mal-operation thereof.

18. A power system, comprising:

a plurality of power equipments;

a plurality of terminal devices one-to-one correspondingly provided on the power equipments; and at least one control device communicatively connected to each of the terminal devices through a network, wherein each of the terminal devices is the intelligent terminal device of claim 1 for preventing mal-operation of a corresponding one of the power equipments.

19. The power system of claim 18, wherein each of the terminal devices is designated with a unique equipment identification formed by a vendor code, a version label, a version number and a product serial number, such that the unique equipment identification is configured to identify each of the terminal devices and to distinguish each of the terminal devices from other ones of the terminal devices.

20. The power system of claim 18, wherein the communication module of each of the terminal devices comprises:

a microcontroller unit (MCU) configured to process the signals received, generate the status of the power equipment and the status of the at least one safety device, and control the action of the at least one safety device;

a combination circuit, configured to collect information and send the information to the MCU for processing; and a sensor communication module, configured to monitor the status of the power equipment based on the signals received from the at least one sensor;

wherein the sensor communication module, an aggregate node and an access node form a real-time monitoring unit to real-time monitor the power equipment through the at least one sensor.

\* \* \* \* \*